(12) United States Patent
Huang et al.

(10) Patent No.: US 11,061,448 B1
(45) Date of Patent: Jul. 13, 2021

(54) TOUCHPAD MODULE AND COMPUTING DEVICE USING SAME

(71) Applicant: Primax Electronics Ltd., Taipei (TW)

(72) Inventors: Tai-Sou Huang, Taipei (TW);
Chia-Feng Lee, Taipei (TW);
Chang-Tse Lee, Taipei (TW);
Chun-Ming Hsu, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 16/859,806

(22) Filed: Apr. 27, 2020

(30) Foreign Application Priority Data

Mar. 13, 2020 (TW) .................................. 109108434

(51) Int. Cl.
*G06F 1/16* (2006.01)
*G06F 3/01* (2006.01)
*G06F 3/0354* (2013.01)

(52) U.S. Cl.
CPC .............. *G06F 1/169* (2013.01); *G06F 3/016* (2013.01); *G06F 3/03547* (2013.01)

(58) Field of Classification Search
CPC ....... G06F 1/169; G06F 3/03547; G06F 3/016
See application file for complete search history.

(56) References Cited

U.S. PATENT DOCUMENTS

| | | | | |
|---|---|---|---|---|
| 2005/0052425 A1* | 3/2005 | Zadesky | ................. | G06F 3/041 345/173 |
| 2007/0139388 A1* | 6/2007 | Lee | ......................... | G06F 1/169 345/173 |
| 2008/0202824 A1* | 8/2008 | Philipp | ................. | G06F 3/0488 178/18.01 |
| 2010/0079404 A1* | 4/2010 | Degner | ................... | G06F 1/169 345/174 |
| 2010/0302153 A1* | 12/2010 | Jung | .................... | G06F 3/03547 345/158 |
| 2011/0051360 A1* | 3/2011 | Dabov | .................... | G06F 1/181 361/679.55 |
| 2011/0254786 A1* | 10/2011 | Wen | ....................... | G06F 3/0338 345/173 |
| 2012/0075199 A1* | 3/2012 | Hsieh | .................. | G06F 3/03547 345/173 |
| 2012/0206248 A1* | 8/2012 | Biggs | ................. | H01L 41/0833 340/407.2 |
| 2012/0236587 A1* | 9/2012 | Kim | ..................... | B23K 26/062 362/602 |
| 2016/0117022 A1* | 4/2016 | Kim | ..................... | F25D 29/005 345/174 |
| 2016/0266617 A1* | 9/2016 | Shen | .................... | G06F 3/03547 |
| 2019/0258290 A1* | 8/2019 | Song | ........................ | G06F 1/169 |
| 2020/0089328 A1* | 3/2020 | Wang | .................... | H01H 13/70 |

* cited by examiner

*Primary Examiner* — Chad M Dicke
(74) *Attorney, Agent, or Firm* — Kirton McConkie; Evan R. Witt (57) ABSTRACT

A touchpad module includes a touch member, a bracket, an elastic element and a spacer. The bracket is located under the touch member. The elastic element is arranged between the touch member and the bracket. The spacer is arranged between the elastic element and the touch member. While the touch member is pressed down, the touch member is moved downwardly to compress the spacer and the elastic element is pushed by the at least one spacer. Consequently, the elastic element is subjected to deformation and extended toward the corresponding perforation. The present invention further provides a computing device with the touchpad module.

18 Claims, 10 Drawing Sheets

TOUCHPAD MODULE AND COMPUTING DEVICE USING SAME

FIELD OF THE INVENTION

The present invention relates to an input device, and more particularly to an input device with a touch control function.

BACKGROUND OF THE INVENTION

With increasing development of science and technology, a variety of electronic devices are designed in views of convenience and user-friendliness. For helping the user well operate the electronic devices, the electronic devices are gradually developed in views of humanization. The common electronic devices include for example notebook computers, mobile phones, satellite navigation devices, or the like. Recently, the storage capacity and the processor's computing performance for these electronic devices are largely enhanced, and thus their functions become more powerful and complicated. For efficiently operating an electronic device, a touchpad is used as an input device of the electronic device for controlling the operations of the electronic device.

Figure 1:
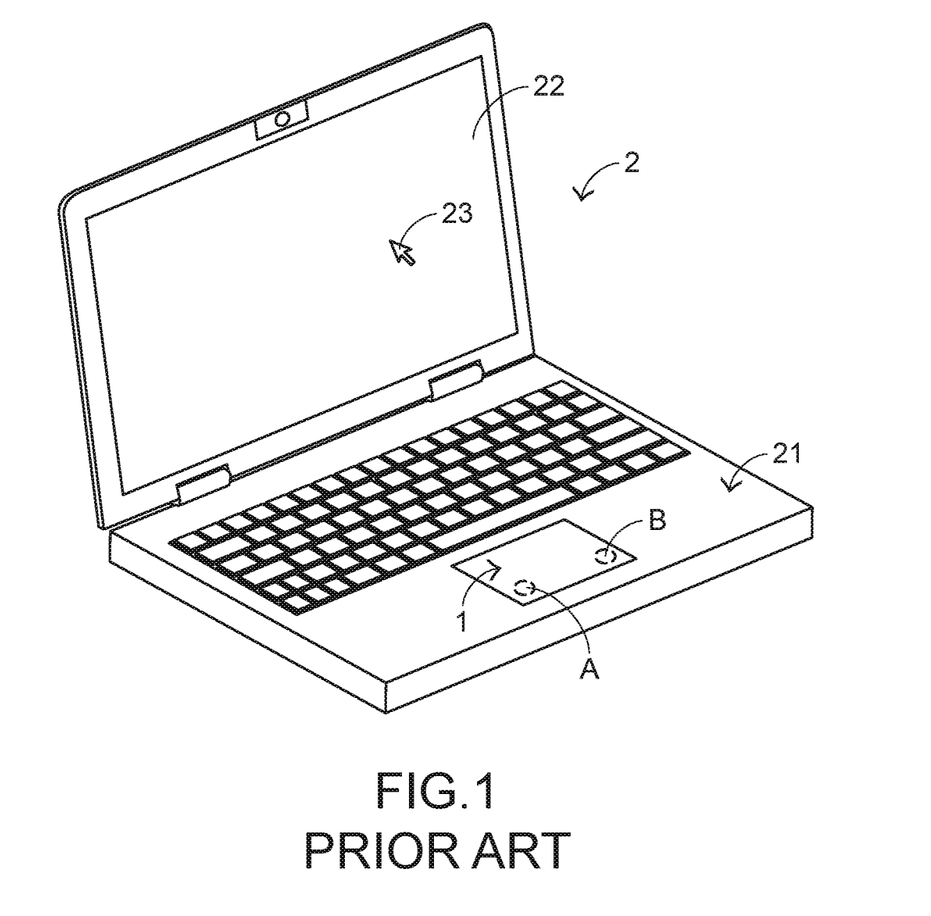
FIG. 1 schematically illustrates a conventional notebook computer with a touchpad module.

FIG. 1 schematically illustrates a conventional notebook computer with a touchpad module. As shown in FIG. 1, the touchpad module 1 is installed on a casing 21 of the notebook computer 2. Moreover, at least a portion of the touchpad module 1 is exposed outside so as to be touched by the user's finger. Consequently, the user may operate the touchpad module 1 to control the notebook computer 2. For example, in case that the user's finger is placed on the touchpad module 1 and slid on the touchpad module 1, a cursor 23 shown on a display screen 22 of the notebook computer 2 is correspondingly moved. Moreover, in case that the touchpad module 1 is pressed down by the user's finger, the notebook computer 2 executes a specified function. The use of the touchpad module 1 can implement some functions of the conventional mouse. In other words, the user may operate the notebook computer 2 through the touchpad module 1 without the need of additionally carrying or installing the mouse.

Figure 2:
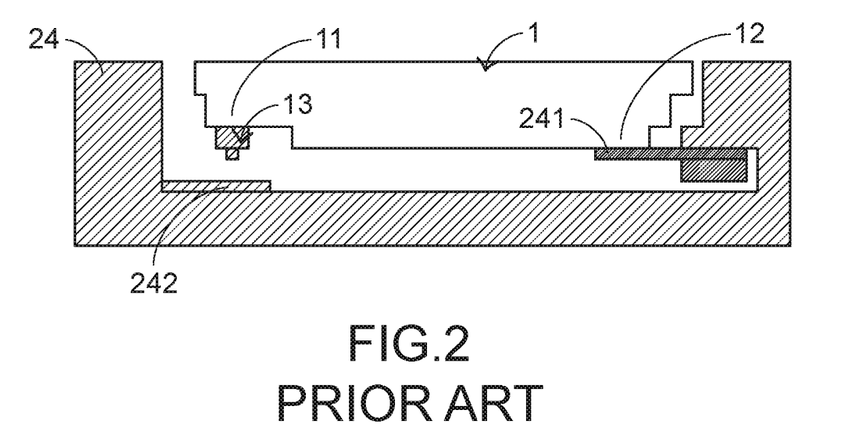
FIG. 2 is a schematic cross-sectional view illustrating the touchpad module as shown in FIG. 1, in which the touchpad module is not pressed down.
Figure 3:
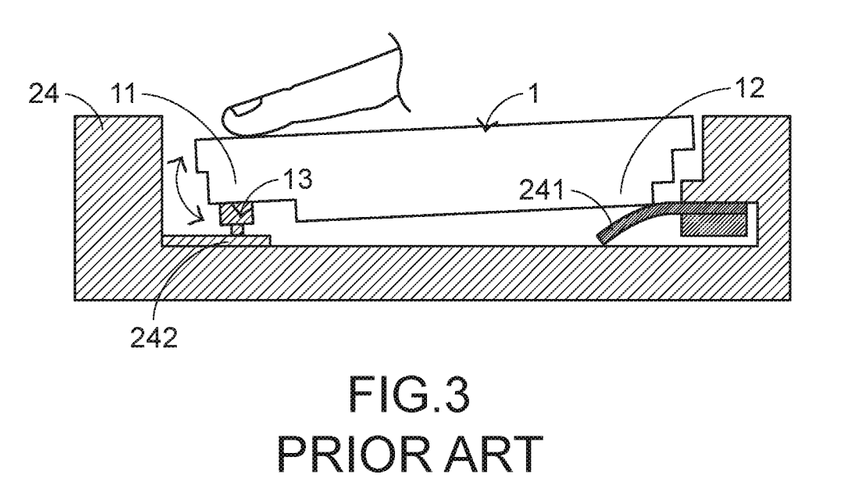
FIG. 3 is a schematic cross-sectional view illustrating the touchpad module as shown in FIG. 2, in which the touchpad module is pressed down.

FIG. 2 is a schematic cross-sectional view illustrating the touchpad module as shown in FIG. 1, in which the touchpad module is not pressed down. FIG. 3 is a schematic cross-sectional view illustrating the touchpad module as shown in FIG. 2, in which the touchpad module is pressed down. As shown in FIGS. 2 and 3, a fixing frame 24 is concavely formed in the casing 21 of the notebook computer 2. A supporting structure 241 and a triggering part 242 are respectively protruded from two opposite sides of an inner wall of the fixing frame 24. A metal dome switch 13 is located at a first end 11 of the touchpad module 1. A second end 12 of the touchpad module 1 is connected with the supporting structure 241.

When the touchpad module 1 is pressed down by the user, the first end 11 of the touchpad module 1 is swung downwardly relative to the triggering part 242 by using the supporting structure 241 as a fulcrum. As the metal dome switch 13 of the touchpad module 1 is pushed by the triggering part 242 of the fixing frame 24, the metal dome switch 13 is triggered and a click feedback sound is generated. Moreover, after the metal dome switch 13 is triggered, the touchpad module 1 generates a switch control signal to the notebook computer 2. According to the switch control signal, the notebook computer 2 executes a corresponding function.

When the touchpad module 1 is no longer pressed by the user, the first end 11 of the touchpad module 1 is swung upwardly relative to the triggering part 242 in response to an elastic force of the supporting structure 241. Consequently, the touchpad module 1 is returned to its original position.

However, the conventional touchpad module 1 still has some drawbacks. For example, after the touchpad module 1 is pressed down, the travelling distances corresponding to different locations of the touchpad module 1 are different. The different travelling distances corresponding to different locations become hindrance from operating the touchpad module 1. For example, as shown in FIG. 1, the region A and the region B are located at two corners of the touchpad module 1, respectively. Moreover, the region A and the region B are located at two opposite sides of the first end 11 of the touchpad module 1. If one of the region A and the region B is pressed by the user, there is a large difference between the downward travelling distances of the region A and the region B. Under this circumstance, the operating tactile feel is impaired, or even the metal dome switch 13 is unable to be effectively triggered.

Figure 4:
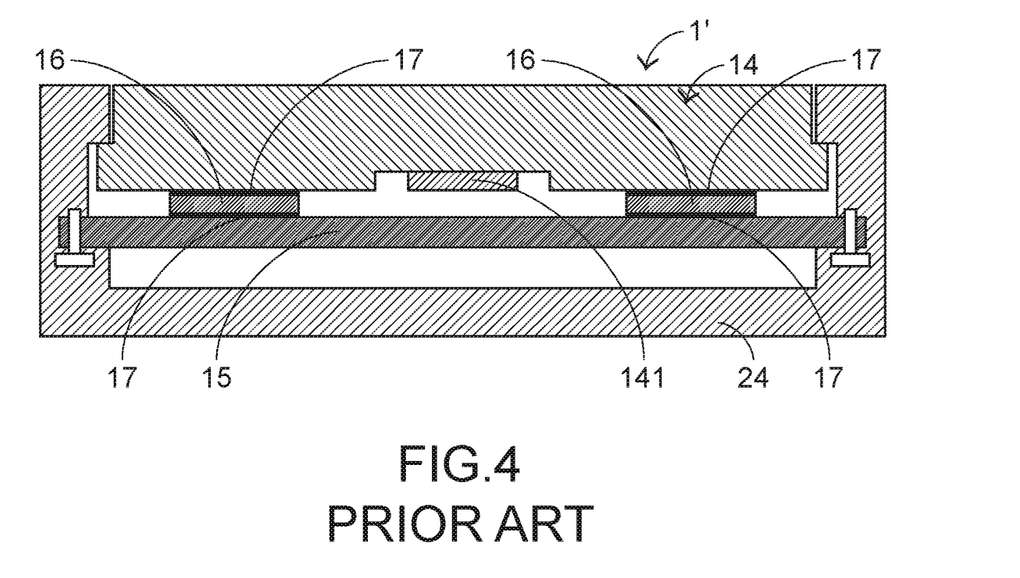
FIG. 4 is a schematic side view illustrating another touchpad module.

For solving the above drawbacks, another conventional touchpad module was disclosed. FIG. 4 is a schematic side view illustrating another touchpad module. The touchpad module 1' comprises a touch member 14, a bracket 15 and plural silicone rubber elements 16. A haptic sensor 141 is installed on a bottom surface of the touch member 14. The bracket 15 is located under the touch member 14 and fixed within the fixing frame 24. The plural silicone rubber elements 16 are arranged between the touch member 14 and the bracket 15. When any position of the touchpad module 1' is pressed by the user, the touchpad module 1' is moved downwardly to push and compress the silicone rubber elements 16. At the same time, the haptic sensor 141 is triggered, and the touchpad module 1' issues a switch control signal to the notebook computer 2. According to the switch control signal, the computing device 4 executes a corresponding command. When the touchpad module 1' is not pressed down, the touchpad module 1' is swung upwardly relative to the bracket 15 in response to the elastic forces of the compressed silicone rubber elements 16. Consequently, the touchpad module 1' is restored to its original position.

However, the manufacturing process of the touchpad module 1' still has some drawbacks. For example, the silicone rubber elements 16 is combined with the touch member 14 and the bracket 15 through adhesive layers 17. As known, a jig tool is used to laminate the combination structure of the silicone rubber elements 16, the touch member 14, the bracket 15 and adhesive layers 17, and the combination structure is subjected to a baking process for at least 30 minutes. The silicone rubber elements 16 are used as elastomers for providing elastic forces when the touchpad module 1' is compressed. In other words, the process of manufacturing the touchpad module 1' with the silicone rubber elements 16 is time-consuming and complicated. Moreover, if the junction between the touch member 14 and the silicone rubber element 16 is not well cleaned and contaminate (e.g., oil stain) is retained, the silicone rubber element 16 cannot be firmly attached on the touch member 14. In other words, the silicone rubber elements 16 are readily detached from the touch member 14. This is an important factor influencing the yield of the touchpad module 1'.

In other words, the conventional touchpad module and the conventional computing device with the touchpad module need to be further improved.

SUMMARY OF THE INVENTION

An object of the present invention provides a touchpad module with good yield, and the process of manufacturing the touchpad module is simplified.

Another object of the present invention provides a computing device with the touchpad module.

In accordance with an aspect of the present invention, a touchpad module is provided. The touchpad module includes a touch member, a bracket, at least one elastic element and at least one spacer. A switch element is located at a bottom side of the touch member. The bracket is located under the touch member. The bracket includes at least one perforation. The at least one elastic element is arranged between the touch member and the bracket, and located over the at least one perforation. The at least one spacer is arranged between the at least one elastic element and the touch member, and aligned with the corresponding perforation. While the touch member is pressed down, the touch member is moved downwardly to compress the at least one spacer and the at least one elastic element is pushed by the at least one spacer, so that the at least one elastic element is subjected to deformation and extended toward the corresponding perforation.

In accordance with another aspect of the present invention, a computing device is provided. The computing device includes a casing, a processor and a touchpad module. An accommodation space is concavely formed in the casing. The processor is disposed within the casing. The touchpad module is disposed within the accommodation space and electrically connected with the processor. The touchpad module includes a touch member, a bracket, at least one elastic element and at least one spacer. A switch element is located at a bottom side of the touch member. The bracket is located under the touch member. The bracket includes at least one perforation. The at least one elastic element is arranged between the touch member and the bracket, and located over the at least one perforation. The at least one spacer is arranged between the at least one elastic element and the touch member, and aligned with the corresponding perforation. While the touch member is pressed down, the touch member is moved downwardly to compress the at least one spacer and the at least one elastic element is pushed by the at least one spacer, so that the at least one elastic element is subjected to deformation and extended toward the corresponding perforation.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The embodiments of present invention will be described more specifically with reference to the following drawings. Generally, in the drawings and specifications, identical or similar components are designated by identical numeral references. For well understanding the present invention, the elements shown in the drawings are not in scale with the elements of the practical product. In the following embodiments and drawings, the elements irrelevant to the concepts of the present invention or the elements well known to those skilled in the art are omitted. It is noted that numerous modifications and alterations may be made while retaining the teachings of the invention.

Figure 5:
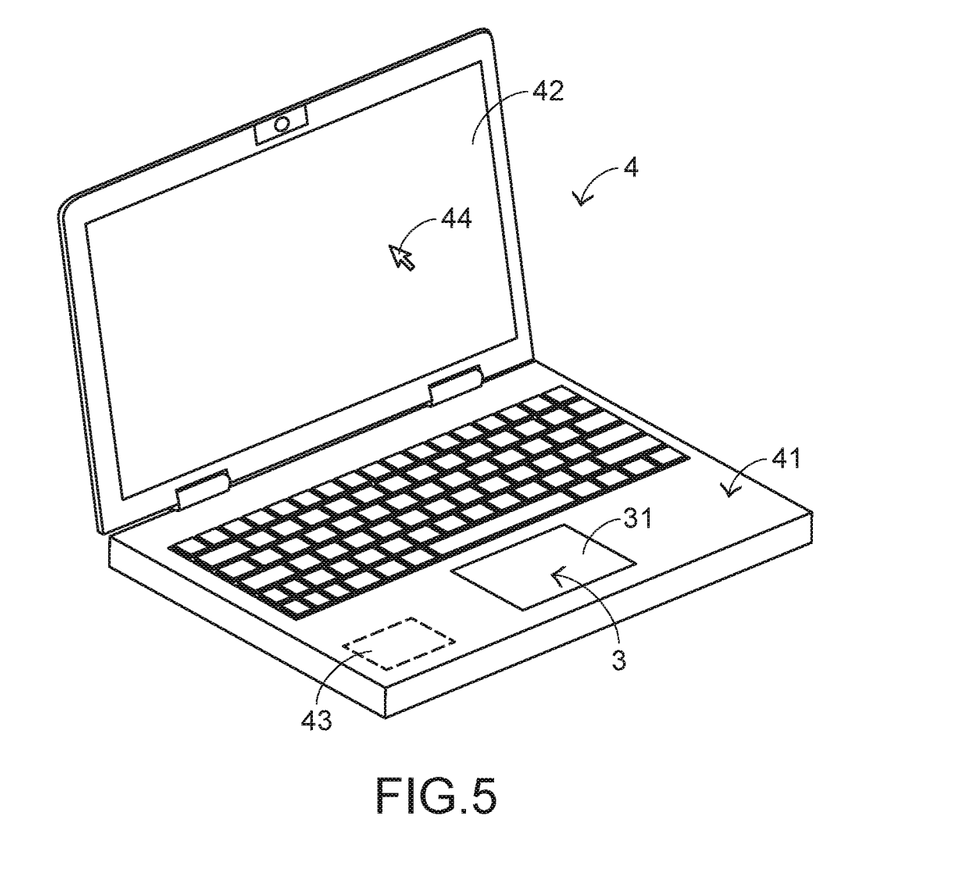
FIG. 5 is a schematic perspective view illustrating the outer appearance of a computing device with a touchpad module according to a first embodiment of the present invention.

FIG. 5 is a schematic perspective view illustrating the outer appearance of a computing device with a touchpad module according to a first embodiment of the present invention. An example of the computing device 4 includes but is not limited to a notebook computer. In an embodiment, the computing device 4 comprises a casing 41, a display screen 42, a processor 43 and a touchpad module 3. Moreover, an accommodation space is concavely formed in the casing 41. The touchpad module 3 is disposed within the accommodation space and electrically connected with the processor 43. Moreover, at least a portion of the touchpad module 3 is exposed outside so as to be touched by the user's finger. Consequently, the user may operate the touchpad module 3 to control the computing device 4. For example, in case that the user's finger is placed on the touchpad module 3 and slid on the touchpad module 3, a cursor 44 shown on the display screen 42 is correspondingly moved. Moreover, in case that the touchpad module 3 is clicked (or pressed) by the user's finger, the computing device 4 executes a specified function.

Figure 6:
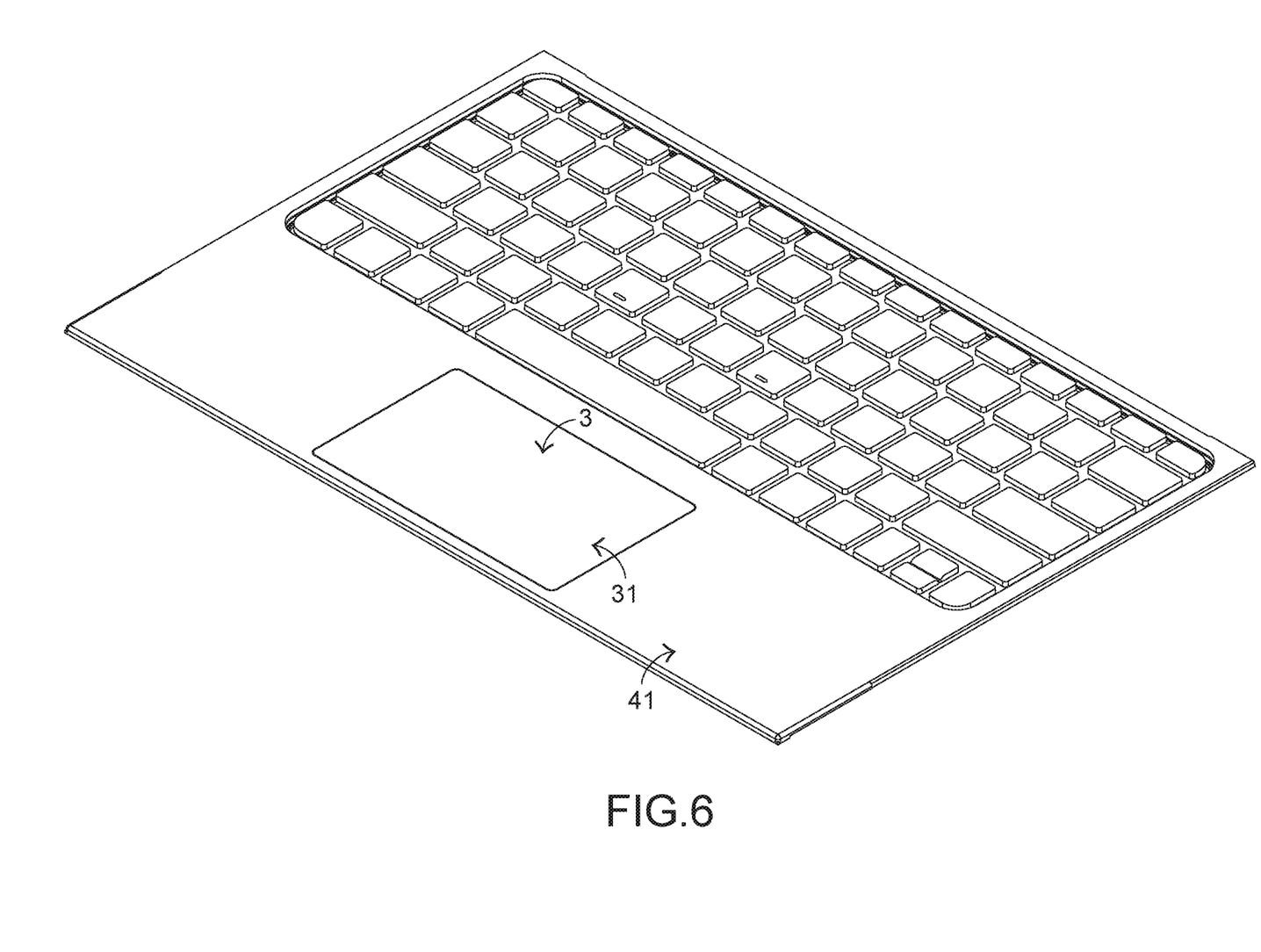
FIG. 6 is a schematic top view illustrating portions of the casing and the touchpad module of the computing device as shown in FIG. 5.
Figure 7:
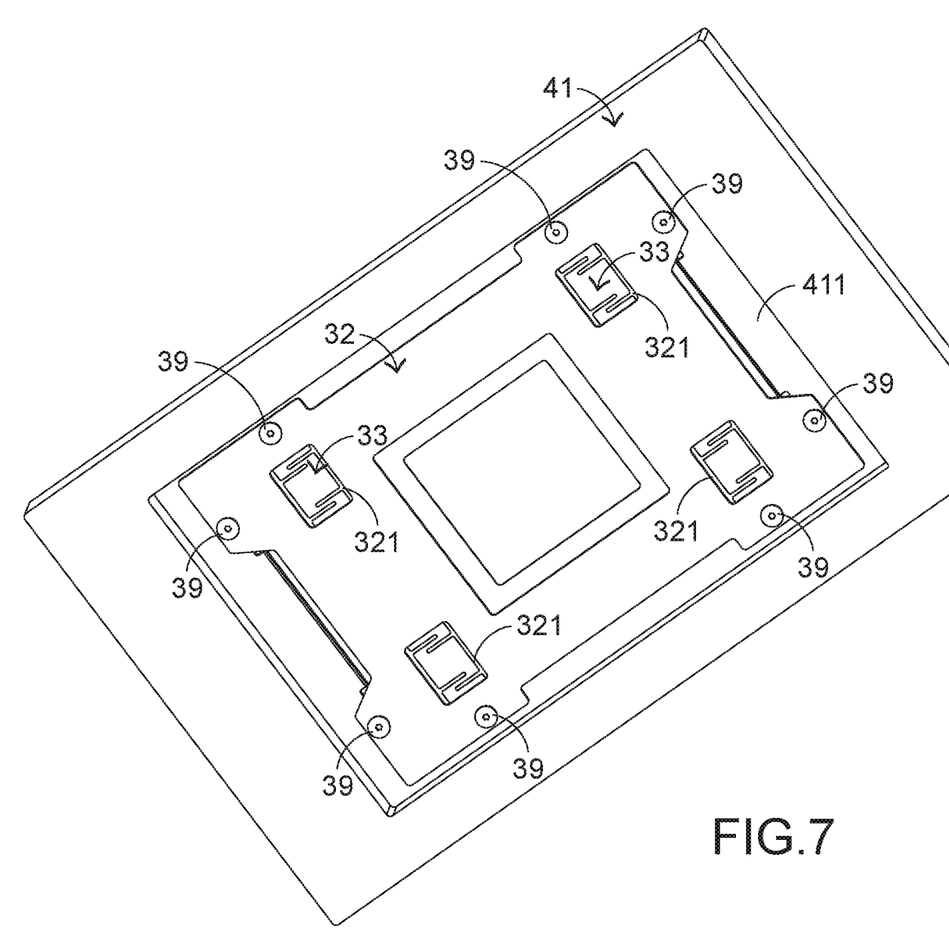
FIG. 7 is a schematic bottom view illustrating portions of the casing and the touchpad module of the computing device as shown in FIG. 5.
Figure 8:
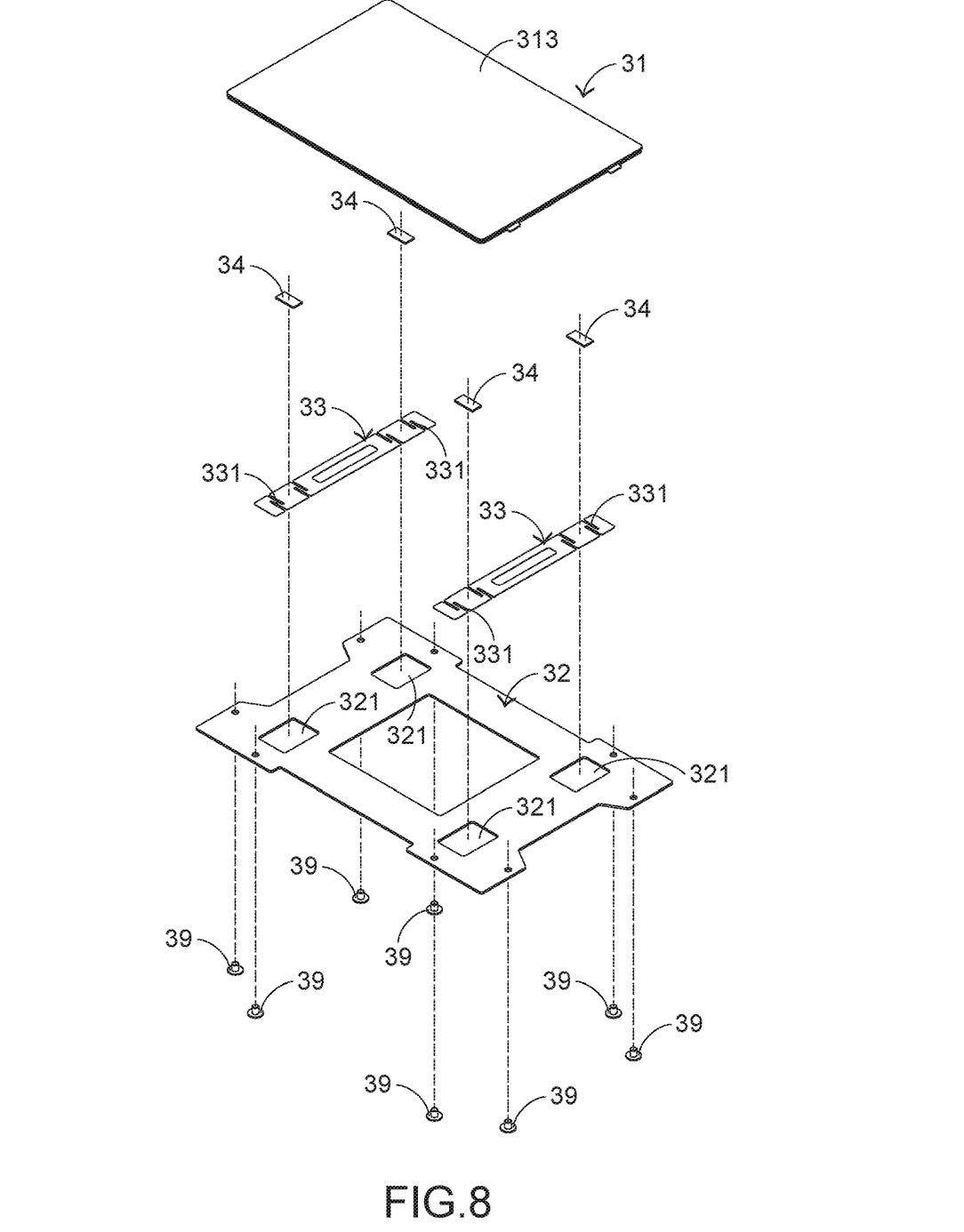
FIG. 8 is a schematic exploded view illustrating portions of the touchpad module as shown in FIG. 7.

Please refer to FIGS. 6, 7 and 8. FIG. 6 is a schematic top view illustrating portions of the casing and the touchpad module of the computing device as shown in FIG. 5. FIG. 7 is a schematic bottom view illustrating portions of the casing and the touchpad module of the computing device as shown in FIG. 5. FIG. 8 is a schematic exploded view illustrating portions of the touchpad module as shown in FIG. 7.

The touchpad module 3 comprises a touch member 31, a bracket 32, two elastic elements 33 and plural spacers 34. A switch element 311 is located at a bottom side of the touch member 31. The bracket 32 is located under the touch member 31 (see FIGS. 9A and 9B). The bracket 32 comprises plural perforations 321. Moreover, as shown in FIG. 7, the bracket 32 is fixed on an inner wall 411 of the casing 41 through fastening elements 39 (e.g., screws). The two elastic elements 33 are arranged between the touch member 31 and the bracket 32 and located over the corresponding perforations 321. The spacers 34 are arranged between the elastic elements 33 and the touch member 31. Moreover, the spacers 34 are aligned with the corresponding perforations 321, respectively.

Figure 9A:
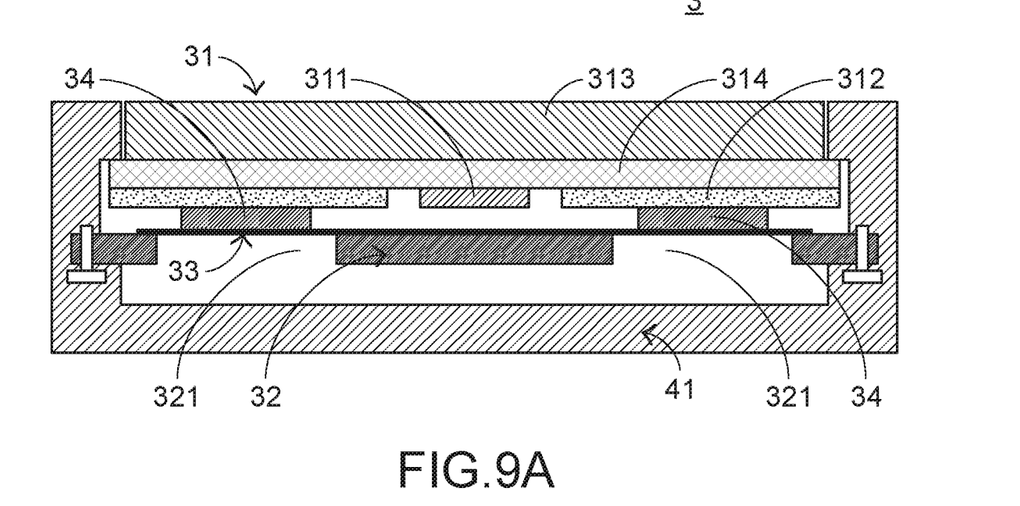
FIG. 9A is a schematic cross-sectional view illustrating a portion of the touchpad module as shown in FIG. 6, in which the touch member of the touchpad module is not pressed down.
Figure 9B:
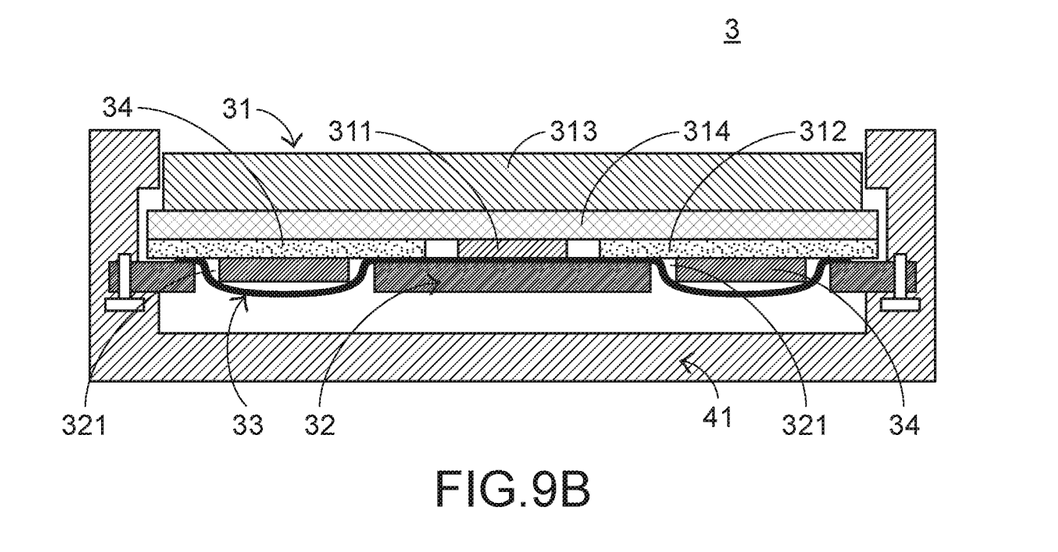
FIG. 9B is a schematic cross-sectional view illustrating a portion of the touchpad module as shown in FIG. 6, in which the touch member of the touchpad module is pressed down.

In an embodiment, the touch member 31 further comprises a covering plate 313, a circuit board 314 and a reinforcing layer 312 (see FIGS. 9A and 9B). At least a portion of the covering plate 313 is exposed outside the casing 41. The circuit board 314 is arranged between the covering plate 313 and the reinforcing layer 312. The switch element 311 is installed on a bottom surface of the circuit board 314. The reinforcing layer 312 is used for supporting the covering plate 313 and the circuit board 314 and increasing the structural strength. When the circuit board 314 senses the touching behavior of the user on the covering plate 313, the circuit board 314 issues a corresponding electronic signal. According to the electronic signal, the computing device 4 executes a corresponding command.

Preferably but not exclusively, the covering plate 313 and the circuit board 314 are combined together through an adhesive layer, the covering plate 313 is a glass covering plate or a plastic covering plate, and the adhesive layer is made of a pressure sensitive adhesive (PSA). The switch element 311 is a haptic sensor. Preferably, the elastic elements 33 and the spacers 34 are made of metallic material. Moreover, the elastic elements 33 are coupled to the bracket 32 through a laser welding process, and the spacers 34 are coupled to the reinforcing layer 312 of the touch member 31 through the laser welding process. These examples are presented herein for purpose of illustration and description only. The materials of the covering plate 313, the elastic elements 33 and the spacers 34, the method of coupling the covering plate 313 with the circuit board 314, the method of coupling the elastic elements 33 with the bracket 32, the method of coupling the spacers 34 with the touch member 31 and the type of the switch element 311 may be varied according to the practical requirements.

Hereinafter, the operations of the touchpad module 3 will be described with reference to FIGS. 9A and 9B. FIG. 9A is a schematic cross-sectional view illustrating a portion of the touchpad module as shown in FIG. 6, in which the touch member of the touchpad module is not pressed down. FIG. 9B is a schematic cross-sectional view illustrating a portion of the touchpad module as shown in FIG. 6, in which the touch member of the touchpad module is pressed down.

When any position of the covering plate 313 of the touch member 31 is pressed down, the touch member 31 is moved downwardly relative to the bracket 32. As the touch member 31 is moved downwardly to compress the spacers 34, the elastic elements 33 are pushed by the spacers 34. Consequently, as shown in FIG. 9B, each elastic element 33 is subjected to deformation and extended toward the corresponding perforation 321 of the bracket 32. At the same time, the switch element 311 on the bottom surface of the circuit board 314 is triggered, and the circuit board 314 issues a corresponding electronic signal. Moreover, the switch element 311 provides haptic feedback.

When the touch member 31 is not pressed down, the spacers 34 are pushed in response to the elastic forces of the deformed elastic elements 33. As the touch member 31 is moved upwardly relative to the bracket 32, the touch member 31 is returned to its original position (see FIG. 9A).

Figure 10:
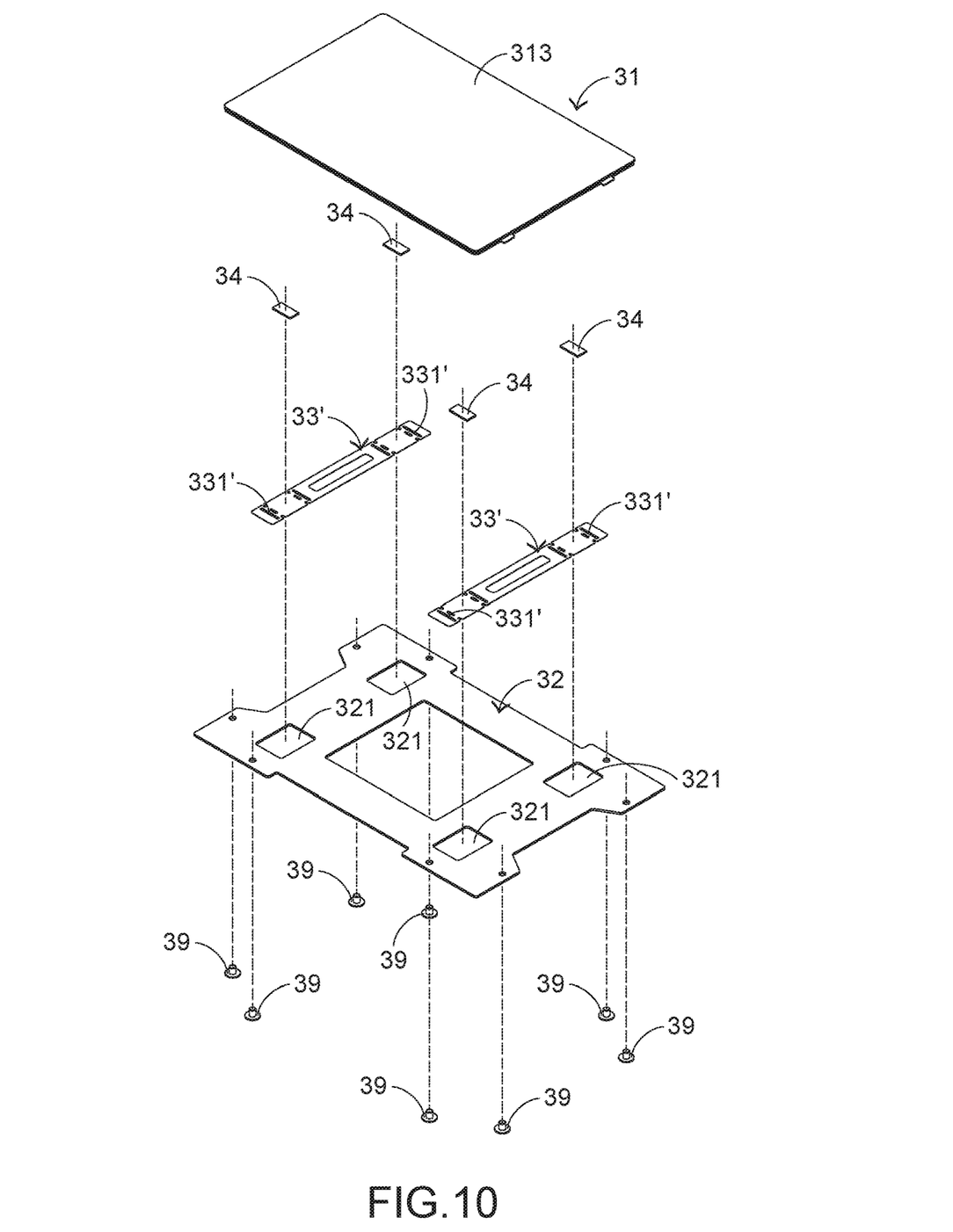
FIG. 10 is a schematic exploded view illustrating portions of a touchpad module according to a second embodiment of the present invention.

In the above embodiment as shown in FIG. 8, each elastic element 33 comprises plural openings 331 corresponding to the perforations 321 of the bracket 32. Due to the openings 331, the ductility of the elastic element 33 to undergo upward and downward deformation is enhanced. That is, the openings 331 are helpful for the action of the touchpad module 3. It is noted that the profiles of the openings of the elastic element 33 are not restricted. That is, the profiles of the openings of the elastic element may be varied according to the practical requirements. For example, in the embodiment of FIG. 10, the profiles of the openings 331' of the elastic element 33' are different from those of FIG. 8.

As mentioned above, the manufacturing process of the touchpad module of the present invention is beneficial. For example, the elastic elements are coupled to the bracket through the laser welding process, and the spacers are coupled to the reinforcing layer of the touch member through the laser welding process. According to the conventional technologies, silicone rubber elements are used as elastomers for providing elastic forces when the touchpad module is compressed. When compared with the conventional technologies, the process of manufacturing the touchpad module of the present invention is more time-saving and simpler. In addition, associated components are readily detached from the touchpad module. Consequently, the yield of the touchpad module is increased.

Figure 11:
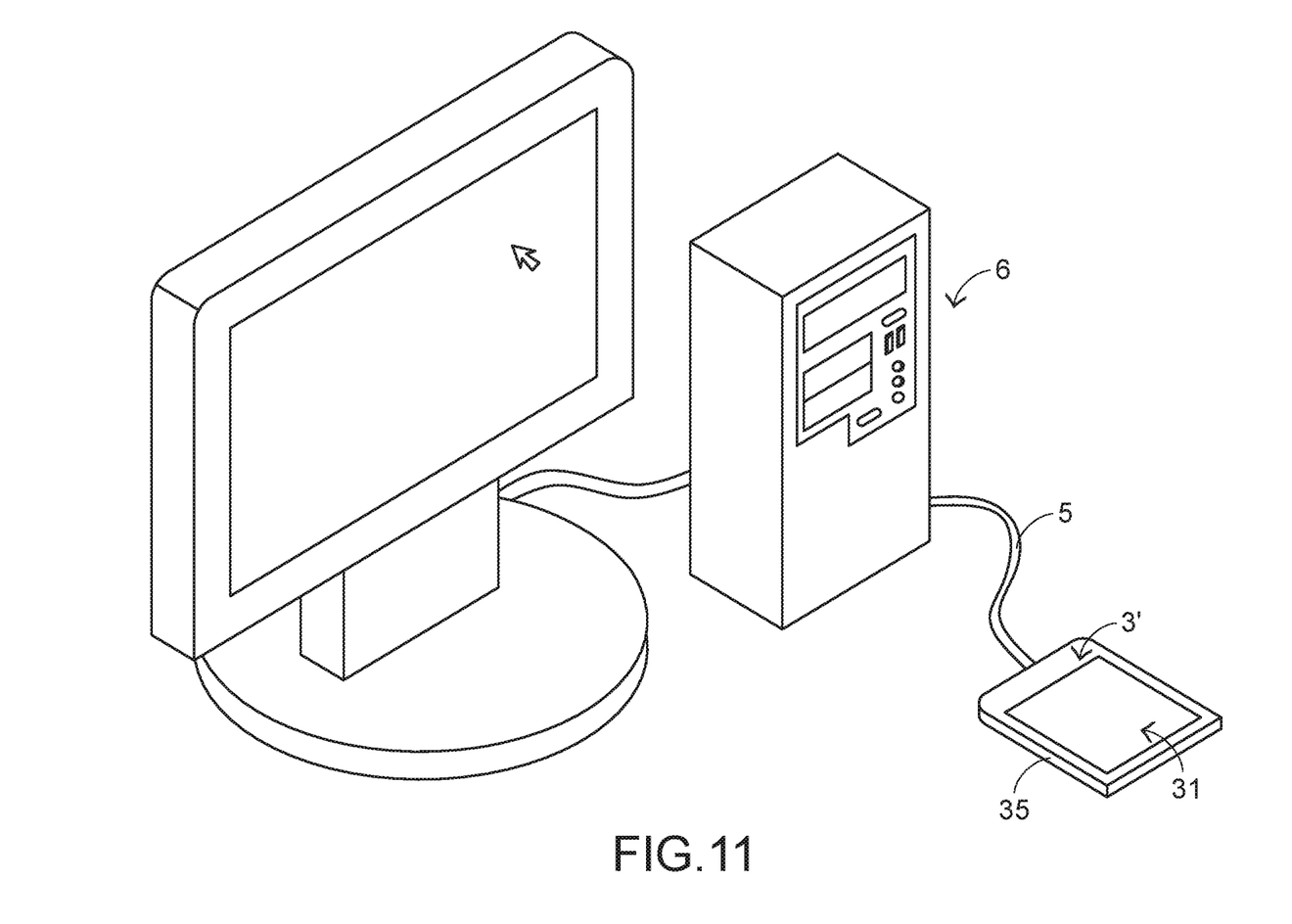
FIG. 11 schematically illustrates a touchpad module for a computing device according to a third embodiment of the present invention.

In the above embodiments, the touchpad module is installed in the computing device. It is noted that numerous modifications and alterations may be made while retaining the teachings of the invention. FIG. 11 schematically illustrates a touchpad module for a computing device according to a third embodiment of the present invention. As shown in FIG. 11, the touchpad module 3' is an external input device that is independent from the computing device. The touchpad module 3' is in communication with a desktop computer 6 through a signal communication interface 5. For example, the signal communication interface 5 is a universal serial bus (USB). In comparison with the touchpad module 3 of the above embodiment, the touchpad module 3' of this embodiment further comprises an outer shell 35. The outer shell 35 is an individual component for accommodating the touch member 31, the bracket 32, the elastic element 33 and the spacers 34. The structures of the other components of the touchpad module 3' are identical to those of the above embodiment, and not redundantly described herein.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touchpad module, comprising:
   a touch member, wherein a switch element is located at a bottom side of the touch member, wherein the touch member comprises a covering plate and a circuit board, wherein the covering plate is located over the circuit board, at least a portion of the covering plate is exposed outside a casing, and the switch element is installed on a bottom surface of the circuit board;
   a bracket located under the touch member, and comprising at least one perforation;

at least one elastic element arranged between the touch member and the bracket, and located over the at least one perforation; and at least one spacer arranged between the at least one elastic element and the touch member, and aligned with the corresponding perforation, wherein while the touch member is pressed down, the touch member is moved downwardly to compress the at least one spacer and the at least one elastic element is pushed by the at least one spacer, so that the at least one elastic element is subjected to deformation and extended toward the corresponding perforation.

2. The touchpad module according to claim 1, wherein the covering plate is a glass covering plate or a plastic covering plate, and the covering plate and the circuit board are combined together through an adhesive layer.

3. The touchpad module according to claim 1, wherein the casing is included in a computing device, or the touchpad module contains the casing.

4. The touchpad module according to claim 1, wherein the touch member further comprises a reinforcing layer, and the reinforcing layer is located under the circuit board.

5. The touchpad module according to claim 1, wherein the at least one elastic element is made of metallic material.

6. The touchpad module according to claim 1, wherein the at least one spacer is made of metallic material.

7. The touchpad module according to claim 1, wherein the at least one elastic element is coupled to the bracket through a laser welding process.

8. The touchpad module according to claim 1, wherein the at least one spacer is coupled to the touch member through a laser welding process.

9. The touchpad module according to claim 1, wherein each elastic element comprises at least one opening corresponding to the at least one perforation.

10. The touchpad module according to claim 1, wherein the switch element is a haptic sensor.

11. A computing device, comprising:
a casing, wherein an accommodation space is concavely formed in the casing;
a processor disposed within the casing; and
a touchpad module disposed within the accommodation space and electrically connected with the processor, wherein the touchpad module comprises:

a touch member, wherein a switch element is located at a bottom side of the touch member, wherein the touch member comprises a covering plate and a circuit board, wherein the covering plate is located over the circuit board, at least a portion of the covering plate is exposed outside a casing, and the switch element is installed on a bottom surface of the circuit board;

a bracket located under the touch member, and comprising at least one perforation;

at least one elastic element arranged between the touch member and the bracket, and located over the at least one perforation; and at least one spacer arranged between the at least one elastic element and the touch member, and aligned with the corresponding perforation, wherein while the touch member is pressed down, the touch member is moved downwardly to compress the at least one spacer and the at least one elastic element is pushed by the at least one spacer, so that the at least one elastic element is subjected to deformation and extended toward the corresponding perforation.

12. The computing device according to claim 11, wherein the touch member further comprises a reinforcing layer, and the reinforcing layer is located under the circuit board.

13. The computing device according to claim 11, wherein the at least one elastic element is made of metallic material.

14. The computing device according to claim 11, wherein the at least one spacer is made of metallic material.

15. The computing device according to claim 11, wherein the at least one elastic element is coupled to the bracket through a laser welding process.

16. The computing device according to claim 11, wherein the at least one spacer is coupled to the touch member through a laser welding process.

17. The computing device according to claim 11, wherein each elastic element comprises at least one opening corresponding to the at least one perforation.

18. The computing device according to claim 11, wherein the switch element is a haptic sensor.

* * * * *